United States Patent
Cote et al.

(10) Patent No.: US 7,684,626 B1
(45) Date of Patent: Mar. 23, 2010

(54) METHOD AND APPARATUS FOR IMAGE DECODER POST-PROCESSING USING IMAGE PRE-PROCESSING AND IMAGE ENCODING INFORMATION

(75) Inventors: Guy Cote, San Jose, CA (US); José R. Alvarez, Sunnyvale, CA (US)

(73) Assignee: Maxim Integrated Products, Sunnyvale, CA (US)

( * ) Notice: Subject to any disclaimer, the term of this patent is extended or adjusted under 35 U.S.C. 154(b) by 1146 days.

(21) Appl. No.: 11/292,199

(22) Filed: Dec. 1, 2005

(51) Int. Cl.
*G06K 9/36* (2006.01)
*G06K 9/46* (2006.01)
*H04B 1/66* (2006.01)
*H04N 11/02* (2006.01)
*H04N 11/04* (2006.01)
*H04N 7/12* (2006.01)

(52) U.S. Cl. .................. 382/232; 375/240.29
(58) Field of Classification Search .......... 382/232
See application file for complete search history.

(56) References Cited

U.S. PATENT DOCUMENTS

| 7,006,576 | B1 * | 2/2006 | Hannuksela | 375/240.27 |
| 2003/0113027 | A1 * | 6/2003 | Chan et al. | 382/240 |
| 2003/0202589 | A1 * | 10/2003 | Reitmeier et al. | 375/240.12 |
| 2005/0008240 | A1 * | 1/2005 | Banerji et al. | 382/238 |
| 2005/0259729 | A1 * | 11/2005 | Sun | 375/240.1 |
| 2006/0209950 | A1 * | 9/2006 | Zhu | 375/240.03 |
| 2006/0222014 | A1 * | 10/2006 | Zhang | 370/476 |
| 2007/0058716 | A1 * | 3/2007 | Blum | 375/240.03 |
| 2007/0113242 | A1 * | 5/2007 | Fetkovich | 725/19 |
| 2007/0117291 | A1 * | 5/2007 | Cooper et al. | 438/166 |
| 2007/0160147 | A1 * | 7/2007 | Kondo et al. | 375/240.18 |

OTHER PUBLICATIONS

Thomas Wiegand, et al. "Overview of the H.264/AVC Video Coding Standard", IEEE Transactions on Circuits and Systems for Video Technology. vol. 13, No. 7, Jul. 2003. 560-576.*

* cited by examiner

*Primary Examiner*—Samir A. Ahmed
*Assistant Examiner*—Li Liu
(74) *Attorney, Agent, or Firm*—Christopher P. Maiorana, PC (57) ABSTRACT

A method for image decoding is disclosed. The method generally includes the steps of (A) receiving from a medium (1) an encoded signal and (2) transform data comprising at least one of (i) encoding statistics embedded in the encoded signal, (ii) encoding information and (iii) pre-processing information, wherein (a) the encoding statistics are created by an encoder in encoding an intermediate input signal to create the encoded signal, (b) the encoding information is producible by the encoder in the encoding and (c) the pre-processing information is producible by a pre-processor in converting an image input signal into the intermediate input signal, (B) generating an intermediate output signal by decoding the encoded signal and (C) generating an image output signal by processing the intermediate output signal in response to the transform data.

20 Claims, 3 Drawing Sheets

METHOD AND APPARATUS FOR IMAGE DECODER POST-PROCESSING USING IMAGE PRE-PROCESSING AND IMAGE ENCODING INFORMATION

FIELD OF THE INVENTION

The present invention relates to a method and/or architecture for image encoding and decoding generally and, more particularly, to a method and apparatus for image decoder post-processing using image pre-processing information and image encoding information.

BACKGROUND OF THE INVENTION

Conventional methods exist for creating low bit rate and/or low-quality video bitstreams for various applications. However, extending such conventional methods to create content for high-quality portable video bitstreams results in a number of problems. The problems can occur when recording at a full capture resolution, including power costs, heat dissipation, storage capacity and cost of the processor. Other problems are caused by some fundamental compromises in quality versus bit rate imposed by hybrid compression technologies. Practical difficulties exist moving the content into a more powerful authoring workstation or transcoder to finalize the content. Furthermore, systems to protect the content in the process of transferring and manipulation for finalization are often missing.

Several methods currently exist for post-processing decompressed video. However, current methods process the decompressed video with no information from the capture processing, pre-processing and/or encoding processing. At very low bit rates, an importance for video post-processing is considerably higher than at higher bit rates since the video quality from low bit rate streams can be improved considerably by post-processing.

SUMMARY OF THE INVENTION

The present invention concerns a method for image decoding. The method generally comprises the steps of (A) receiving from a medium (1) an encoded signal and (2) transform data comprising at least one of (i) encoding statistics embedded in the encoded signal, (ii) encoding information and (iii) pre-processing information, wherein (a) the encoding statistics are created by an encoder in encoding an intermediate input signal to create the encoded signal, (b) the encoding information is producible by the encoder in the encoding and (c) the pre-processing information is producible by a pre-processor in converting an image input signal into the intermediate input signal, (B) generating an intermediate output signal by decoding the encoded signal and (C) generating an image output signal by processing the intermediate output signal in response to the transform data.

The objects, features and advantages of the present invention include providing a method and apparatus for image decoder post-processing using image pre-processing information and image encoding information that may (i) utilize pre-encoding processing information in post-decoding processing, (ii) utilize encoding information in the post-decoding processing, (iii) utilize coding statistics embedded in an encoded signal in the post-decoding processing, (iv) improve a quality of decoded images and/or (v) enable content to be encoded at a lower bit rate, lower bit count and/or higher quality than conventional techniques.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally describes an efficient method and system to perform image post-processing by up-sampling and adaptive filtering as a decoder post-processing step. The decoder post-processing step may utilize meta-data and statistical information data saved/culled in image capture/pre-processing and/or encoding processing. The method/system may enable image content to be recorded at a lower resolution, a lower bit rate and/or a lower bit count than otherwise possible with conventional methods. The image content may be a sequence of video pictures (e.g., a video content) or a still picture (e.g., a picture content). The method/system of the present invention relative to video pictures may be described as applied to an H 0.264/AVC standard, but may be easily extended to any other standard and proprietary video compression schemes. For still pictures, the method/system is generally described as applied to a Joint Photographic Experts Group (JPEG) standard, but may be extended to any other imaging standards and proprietary image compression schemes.

Figure 1:
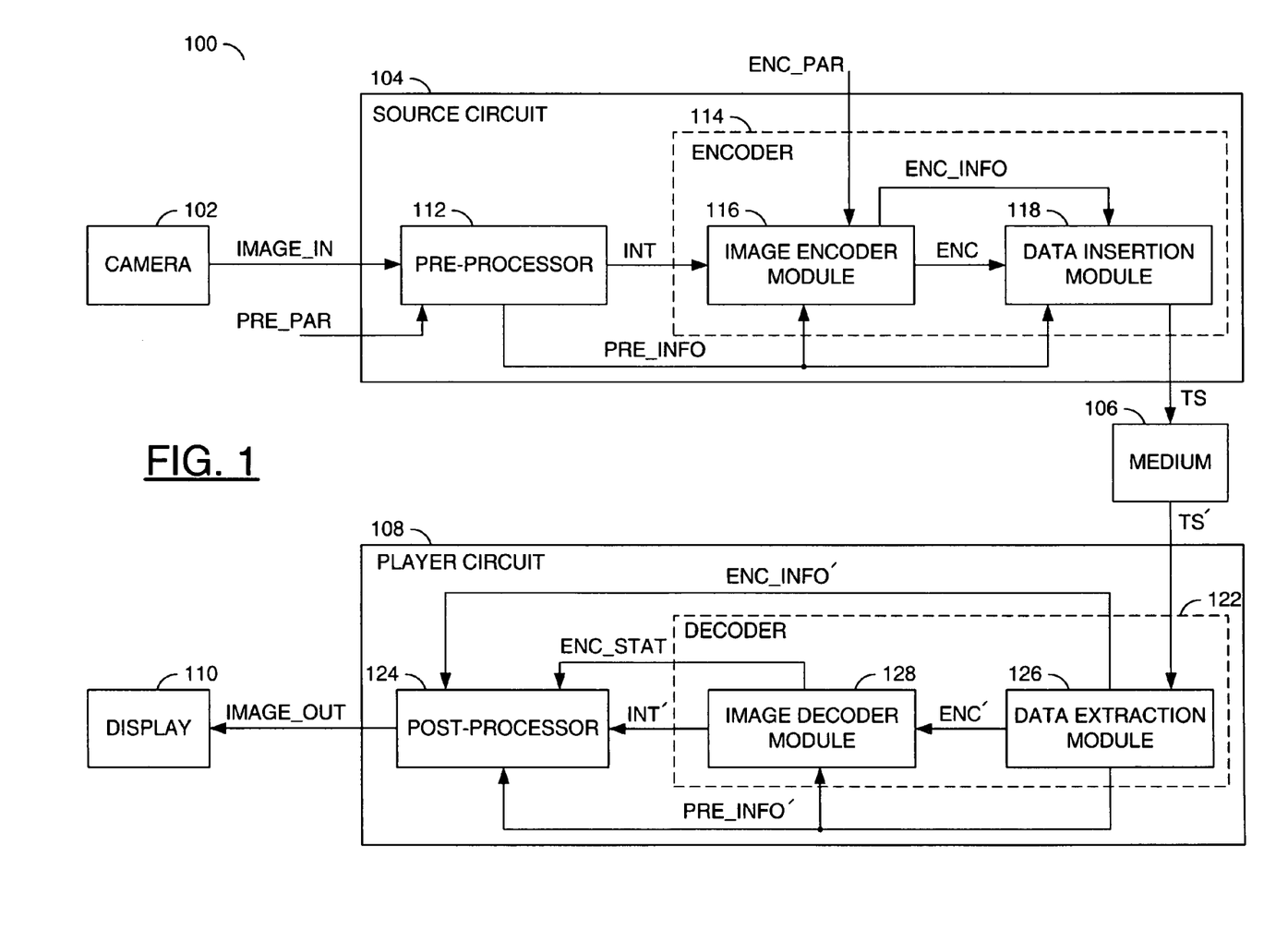
FIG. 1 is a block diagram of an example implementation of a system in accordance with a preferred embodiment of the present invention.

Referring to FIG. 1, a block diagram of an example implementation of a system 100 is shown in accordance with a preferred embodiment of the present invention. The system (or apparatus) 100 generally comprises a circuit (or module) 102, a circuit (or module) 104, a medium 106, a circuit (or module) 108 and a circuit (or module) 110. A signal (e.g., IMAGE_IN) may be generated by the circuit 102. The circuit 104 may convert the signal IMAGE_IN into a transport signal (e.g., TS). The transport signal TS may be transferred to the medium 106. A transport signal (e.g., TS') may be received by the circuit 108 from the medium 106. The circuit 108 may convert the transport signal TS' into a signal (e.g., IMAGE_OUT). The signal IMAGE_OUT may be presented to the circuit 110.

The circuit 102 may be referred to as a camera (or sensor). The camera 102 may be operational to capture an image content as either a single picture or a sequence of pictures. The pictures may be presented to the circuit 104 in either an analog form or a digital form. The image content may have an interlaced scan format or a progressive scan format where the signal IMAGE_IN is a video signal.

The circuit 104 may be referred to as a source circuit. The source circuit 104 may be operational to convert the input pictures in the signal IMAGE_IN into the signal TS. The conversion generally includes pre-encoding processing of the image content and subsequent encoding.

The medium 106 may be implemented as one or more transmission media and/or one or more storage media. Transmission media 106 may include, but are not limited to, radio-frequency broadcasts, satellite broadcasts, cable broadcasts, fiber optical broadcasts and/or video teleconferencing. Storage media 106 may include, but are not limited to, magnetic disks, magnetic tape (e.g., VHS tape), optical tape and/or optical disks (e.g., Digital Versatile Disks). Ideally, the medium 106 may provide a noise free and error free transfer of the data in the signal TS to the signal TS'. As such, the signal TS' may be essentially the same as the signal TS.

If the medium 106 introduce errors in transferring and/or storing the signal TS, one or more error correction codes may be generated by the source circuit 104 and transferred with the signal TS. The error correction codes may be generated within the pre-processing functionality, the encoding functionality and/or shortly before presentation from the source circuit 104. The error correction codes may be embedded in the transport signal TS and/or presented to the medium 106 as side information (e.g., in another channel). When the circuit 108 detects errors, the error correction codes may be used to fix the problems shortly after reception, in a decoding functionality and/or in a post-processing functionality.

The circuit 108 may be referred to as a player circuit. The player circuit 108 may be operated to convert the received signal TS' into the output signal IMAGE_OUT. The conversion may include image decoding operations and post-processing of the image content. The post-processing performed by the player circuit 108 may be based on the information received in the signal TS'.

The circuit 110 may be referred to as a display (or monitor). The display 110 may be operational to present the image content received in the signal IMAGE_OUT in human viewable form. The display 110 may operate in the interlaced scan format and/or the progressive scan format. Where the signal IMAGE_OUT is a still picture, the circuit 110 may be a printer.

The signals TS and TS' may be implemented as video transport signals. In some embodiments, the transport signals TS and TS' (e.g., video bitstreams) may be compliant with an H.264/AVC standard. The H.264/AVC standard is published by Joint Video Team (JVT) of the International Organization for Standardization/International Electrotechnical Commission (ISO/IEC) Moving Picture Experts Group (MPEG) and the Video Coding Expert Group (VCEG) of the International Telecommunications Union-Telecommunications (ITU-T) Standardization Sector, Geneva, Switzerland. In other embodiments, the transport signals TS and TS' may be compliant with an H.263 standard, an H.262 standard or an H.261 standard, also published by the ITU-T. In still other embodiments, the transport signals TS and TS' may be compliant with an MPEG-2 standard or an MPEG-4 standard, published by the ISO/IEC MPEG, Geneva, Switzerland. In still other embodiments, the transport signals TS and TS' (e.g., image files) may be compliant with the JPEG, a Tagged Image File Format (TIFF), a Graphics Interchange Format (GIF) and a Portable Network Graphics (PNG) standards. Other image coding standards, video coding standards and proprietary formats may be implemented to meet the criteria of a particular application.

The signal IMAGE_IN may be implemented as either an analog image signal or a digital image signal. When the signal IMAGE_IN is in the analog form, the source circuit 104 may include an analog to digital conversion function to digitize the analog image signal.

The signal IMAGE_OUT may be implemented as either an analog image signal or a digital image signal. When the signal IMAGE_OUT is in the analog form, the player circuit 108 may include a digital to analog conversion function.

The source circuit 104 generally comprises a circuit (or module) 112 and a circuit (or module) 114. The circuit 112 may receive the input signal IMAGE_IN. A signal (e.g., PRE_PAR) may also be received by the circuit 112. The circuit 114 may generate and present the signal TS. A signal (e.g., ENC_PAR) may be received by the circuit 112. An intermediate signal (e.g., INT) may be transferred from the circuit 112 to the circuit 114. An information signal (e.g., PRE_INFO) may also be transferred from the circuit 112 to the circuit 114.

The circuit 112 may be referred to as a pre-processor module. The pre-processor module 112 may be operational to generate the intermediate signal INT from the input signal IMAGE_IN. The pre-processor module 112 may use one or more parameter values (e.g., filter parameters, scaling parameters, etc.) in generating the signal INT. The pre-processor module 112 may use one or more of the parameter values received externally in the signal PRE_PAR. Furthermore, one or more of the parameter values actually used in the pre-processing may be referred to as pre-processing information and carried via the signal PRE_INFO.

The circuit 114 may be referred to as an encoder module. The encoder module may be operational to encode the intermediate input signal INT to generate the signal TS. Encoding of the signal INT may be based on one or more of the parameters received in the signal PRE_INFO and/or one or more parameters received externally in the signal ENC_PAR. For example, if the signal PRE_INFO indicates that a particular field is a repeated field, the encoding may use the information to encode the repeated field as a skipped field. In another example, the signal ENC_PAR may define a maximum bit rate for the encoding. The encoder module 114 may also be operational to insert the pre-processing information received in the signal PRE_INFO into the signal TS.

The encoder module 114 generally comprises a module (or circuit) 116 and a module (or circuit) 118. A signal (e.g., ENC) may be transferred from the module 116 to the module 118. A signal (e.g., ENC_INFO) may also be transferred from the module 116 to the module 118. The signal PRE_INFO may be received by both the module 116 and the module 118.

The module 116 may be referred to as an image encoder module. The image encoder module 116 may be operational to encode the pre-processed signal INT to generate the encoded signal ENC. The encoding may result in a signal compliant with at least one of the H.264, H.263, H.262, H.261, MPEG-2 and MPEG-4 video standards, the JPEG, TIFF, GIF, PNG and other proprietary formats. Encoding information used to encode the signal INT may be presented by the image encoder module 116 in the signal ENC_INFO. Furthermore, the process of encoding the intermediate signal INT generally results in some encoding statistics, relative to the particular encoding process being used, being embedded in the encoded signal ENC.

The module 118 may be referred to as a data insertion module. The data insertion module 118 is generally operational to insert the encoding information from the signal ENC_INFO, the pre-processing information from the signal PRE_INFO and the encoded images from the signal ENC into the output signal TS. Insertion may be in the form of time-division multiplexing, spatial multiplexing, frequency multiplexing and the like. The signal ENC_INFO and the signal PRE_INFO may be expressed in the signal TS in an efficient manner. For example, encoding information and the pre-processing information may be coded using a lossless compression method, such as an entropy coding technique. A combination of the pre-processing information, the encoding information and the encoding statistics may be generally referred to as transform data. The transform data generally provides details about how the image content was transformed from the signal IMAGE_IN into the signal TS. Additional processing of the output signal TS after the data insertion module 118 may be performed by the encoder module 114 to meet the criteria of a particular codec standard or any proprietary format.

The player circuit 108 generally comprises a module (or circuit) 122 and a module (or circuit) 124. The module 122 may receive the signal TS' from the medium 106. The module 124 may present the signal IMAGE_OUT to the display 110. An intermediate signal (e.g., INT') may be transferred from the module 122 to the module 124. A signal (e.g., PRE_INFO') may also be transferred from the module 122 to the module 124. A signal (e.g., ENC_INFO') may be transferred from the module 122 to the module 124. The module 122 may present an optional signal (e.g., ENC_STAT) to the module 124.

The module 122 may be referred to as a decoder module. The decoder module 122 may be operational to decode the signal TS' to generate the signal INT'. The decoding operation may be configured to decode with the signal TS' (e.g., video bitstream or image file) compliant with at least one of the H.264, H.263, H.262, H.261, MPEG-2 and MPEG-4 video standards, the JPEG, TIFF, GIF and PNG formats and any proprietary formats. The decoder module 122 may be further operational to recreate the transform data (e.g., the encoding information, the pre-processing information and the encoding statistics) from the signal TS'. The decoder module 122 may present the encoding information in the signal ENC_INFO' and the pre-processing information in the signal PRE_INFO'. The decoder module 122 may also be operational to reconstruct encoding statistics information based on the received image content. The encoding statistics may be presented in the signal ENC_STAT.

The module 124 may be referred to as a post-processor module. The post-processor module 124 may be operational to process the signal INT' to create the signal IMAGE_OUT. The operations of the post-processor module 124 may be based on the pre-processing information and the encoding information received in the signals PRE_INFO' and ENC_INFO'. The post-processing operations may also be based on the information received in the signal ENC_STAT.

The signal INT' is generally a decoded image signal in digital form. The image content in the signal INT' may be a very close approximation of the image content in the signal INT (received by the encoder circuit 114). The image content within the signal INT' generally utilizes post-processing before being presented in the signal IMAGE_OUT.

The decoder module 122 generally comprises a module (or circuit) 126 and a module (or circuit) 128. The module 126 may receive the signal TS'. The module 128 may generate the signal INT'. A signal (e.g., ENC') may be transferred from the module 126 to the module 128. The module 126 may present the signal PRE_INFO' to the post-processor module 124 and the module 128. The signal ENC_INFO' may be presented from the module 126 to the post-processor module 124. The module 128 may present the signal ENC_STAT to the post-processor module 124.

The module 126 may be referred to as a data extraction module. The data extraction module 126 may be operational to extract (separate) the pre-processing information, the encoding information and the encoded image content from the signal TS'. The pre-processing information may be presented in the signal PRE_INFO'. The encoding information may be presented in the signal ENC_INFO'. The encoded image content may be presented in the signal ENC'.

The module 128 may be referred to as an image decoder module. The image decoder module 128 may be operational to generate the signal INT' by decoding the signal ENC'. The image decoder module 128 may be configured to decode a signal compliant with at least one of the H.264, H.263, H.262, H.261, MPEG-2 and MPEG-4 video standards, the JPEG, TIFF, GIF and PNG formats and any proprietary formats. During the decoding operations, the image decoder module 128 may utilize encoding statistics gathered from the encoded signal ENC'. The image decoder module 128 may also use one or more parameters generated by the pre-processing module 112 and received in the signal PRE_INFO'. The encoding statistics may be presented to the post-processor module 124 in the signal ENC_STAT.

The signal ENC' may carry the encoded image content received in the signal TS'. Ideally, the signal ENC' should be the same as the signal ENC. In practice, noise and errors may cause slight differences between the content of the signals ENC and ENC'.

The signal ENC_STAT may carry encoding statistics used by the image decoder module 128 to decode the encoded image content in the signal ENC'. The encoding statistics determined by the image decoder module 128 may be the same or approximately the same as the encoding statistics utilized by the image encoder module 116 to encode the image content. In practice, a few differences may exist between the encoding statistics as determined by the image encoder module 116 and the encoding statistics as determined by the image decoder module 128.

Rather than compressing the full resolution at the capture point, the present invention may sample and encode a reduced resolution image (e.g., by down-sampling and/or pre-processing), gather meta-data (e.g., pre-processing information and encoding information) and send a compressed form of the gathered information to the post-processing process. By gathering key information about the image content before and during the compression stage, the system 100 may be able to encode at a lower bit rate, a lower bit count and/or a higher quality than with conventional techniques. The gathered information may permit the player circuit 108 to perform better post-processing, improving the fidelity of the decoded image.

Figure 2:
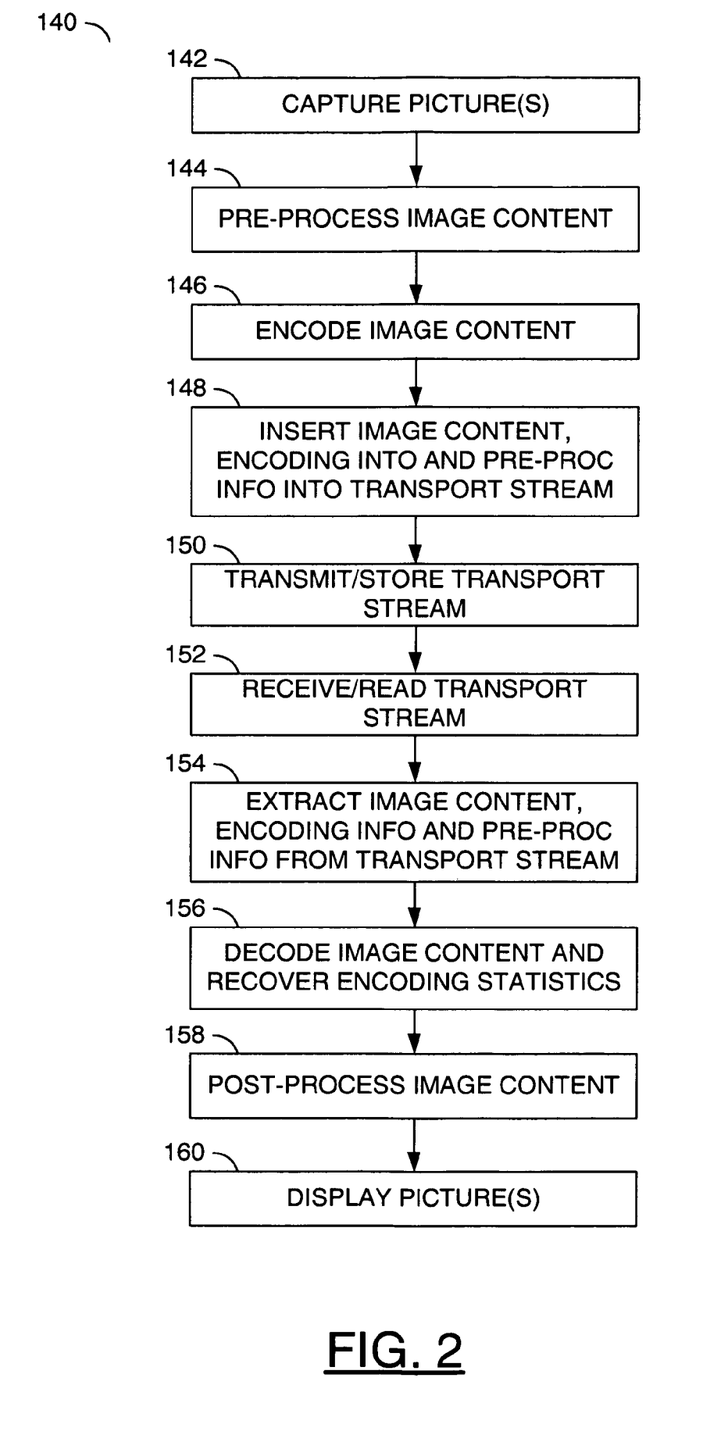
FIG. 2 is a flow diagram of an example method for processing image content.

Referring to FIG. 2, a flow diagram of an example method 140 for processing the image content is shown. The method (or process) 140 generally comprises a step (or block) 142, a step (or block) 144, a step (or block) 146, a step (or block) 148, a step (or block) 150, a step (or block) 152, a step (or block) 154, a step (or block) 156, a step (or block) 158 and a step (or block) 160.

The method 140 may begin with the camera 102 capturing a scene in the step 142. A buffer within the camera 102 may temporarily store the captured scene. The scene may then be presented by the camera 102 in electronic form in the signal IMAGE_IN.

The pre-processor module 112 generally implements various image processing functions in the step 144. The pre-processing function may include, but are not limited to, noise reduction (e.g., spatial and/or temporal), image analysis and feature extraction, image scaling, video de-interlacing and the like. The processed image, along with side pre-processing information collected during the pre-processing operation, may be passed to the image encoder module 116 and subsequently stored for future use by the post-processor module 124 in the player circuit 108.

The image encoder module 116 may encode the image content in the step 146 to create the encoded image content in the signal ENC. The image encoder module 116 may also utilize one or more parameters from the pre-processing information during the encoding operation. Furthermore, the image encoder module 116 may collect additional encoding information during the image encoding stage.

The final encoded images in the signal ENC, along with the side information collected from the pre-processor module 112 in the signal PRE_INFO and the image encoder module 116 in the signal ENC_INFO, may be inserted into the signal TS in the step 148. The signal TS may then be stored and/or transmitted into the medium 106 in the step 150.

Information gathered during the pre-processing process and the encoding process may be sent to the player circuit 108 to improve the quality of the post-processing operations performed by the post-processor module 124. The information could be gathered at a pixel level, a block level (where a block may be a picture area that covers a defined pixel region, a block could be 4×4, 8×8, 16×16 pixels, etc.), or at a picture level. The above information may be transmitted in a number of different ways. For example, in H.264, the information may be signaled with the User Data Supplemental Enhancement Information (SEI) messages.

When the image/picture/frame/field/video in the signal IMAGE_IN is scaled down, compressed and/or subject to any other resizing process, original information is generally lost. Furthermore, if a compression is performed to reduce a bit rate/bit count (e.g., high compression), compression artifacts inherent in the lossy process will generally eliminate more of the original information. To combat the losses, the source circuit 104 generally extracts information from the original content expected to be lost. The extracted information may be expressed in an efficient manner then transferred to the player circuit 108. The player circuit 108 may use the extracted information to intelligently decompress and/or post-process the images.

In general, the following information may be gathered and transmitted to the medium 106 during the capture/pre-processing and encoding steps. Color space conversion: Color conversion generally involves a reduction in an amount of chrominance data in the original content. The source circuit 104 may capture color edge information early in processing. The captured color edge information may then be transferred to the player circuit 108 to restore the lost color edges. Furthermore, specific color areas may be signaled to the player circuit 108 to help enhance features, like flesh tone correction, and to increase the fidelity of difficult color areas, like saturated red colors. The specific color information generally allows the player circuit 108 to reproduce the fidelity of the original image better. The side information may be transmitted in a number of different ways. For example, in H.264, several fields (e.g., colour_primaries fields, transfer_characteristics fields, and matrix_coefficients fields) of a vui_parameters syntax may be use to signal the side information.

Down-sampling: The camera 102 and/or source circuit 104 may record content at a low down-sampled resolution with an intent to up-sample later during post-processing. Down-sampling ratios, as well as information about the down-sampling filters implemented, may be transmitted as side information to the player circuit 108 to determine the appropriate up-sampling ratios and filters to be used on the reconstructed image in the signal INT'. The side information may be transmitted in a number of different ways. For example, in H.264, several fields (e.g., aspect_ratio_idc fields, sar_width fields, and sar_height fields) of the vui_parameters syntax may be use to signal the up-sampling ratios. Furthermore, information about the down-sampling filters used by the source circuit 104 may be signaled in a User Data SEI message.

Edge Detection: Edge information in the images may be in a spatial domain and/or in a temporal domain. Static edges may be distinguished from moving edges for different treatment in the decoding and the post-processing. For example, moving edges may be allowed to have some blurring since the human eye is generally less sensitive to certain kinds of motion. Conversely, static edges typically are easily noticed. Therefore, significant information for the static edges may be transferred to the player circuit 108 to reproduce the static edges as faithfully as possible.

By way of example, the following information could be gathered at the block level. (1) Edge content: information about the location and/or motion of edges in a block. (2) High Frequency content: information about a high frequency content of a block. (3) Motion content: information about a level of motion in a block. (4) Intensity average: information about an intensity average in a block. (5) Variance: information about a pixel variance in a block. (6) Color areas: information about areas of a picture with specific colors, for instance, skin tone areas for special facial processing. (7) Noise/film grain: block statistical information about comfort noise and/or film grain characteristics that may be used by the player 108 to add internally created noise to improve picture quality to particular areas that would benefit from noise addition. For video applications, a block may be defined as a macroblock, a 16×16 block, an 8×16 block, a 16×8 block, an 8×8 block and a 4×4 block. Other block sizes and/or shapes may be implemented to meet the criteria of a particular application.

At the picture or region level, where a region is defined as a noncontiguous overlapping group of macroblocks, the following information is generally gathered: (1) luminance/chrominance average, (2) luminance/chrominance high frequency and texture content, (3) motion content, (4) color content and (5) picture statistical data regarding deblocking control (e.g., information controlling deblocking/non-deblocking).

Additional Encoding Statistics: Additional encoder statistics may be gathered by the encoding process to help with the decoding post-processing. The additional encoding statistics information may include, but is not limited to, (1) macroblock peak signal-to-noise ratios (PSNR) and/or mean square errors (MSE), (2) macroblock number of non-zero coefficients and (3) macroblock variances (e.g., pre-encoded or reconstructed).

The player circuit 108 generally receives the signal TS' from the medium 106 in the step 152. In the step 154, the data extraction module 126 may remove the pre-processing information and the encoding information from the signal TS' leaving the encoded image content in the signal ENC'.

The image decoder module 128 may decode the image content in the step 156. The decoding process may extract additional information from the encoded content in the form of the encoding statistics. The decoded image content and the recovered encoding statistics may be presented to the post-processor module 124. The coding statistics from signal TS' generally comprise syntax elements generated by the image encoder module 116 that may be used to help with the post-processing process in the post-processor module 124. The encoding statistics information may be intrinsic information in the signal ENC. As such, at least some of the encoding statistics produced by the image encoder module 116 may be identified directly from the signal ENC' by the image decoder module 128. As the signal ENC' is being decoded, the image decoder module 128 may store the recovered encoding statistics information in a format more easily readable by the post-processor module 124 to save additional signal parsing by the post-processor module 124.

By way of example, the image encoder module 116 may encode a particular block, having static content relative to a reference block, as a skipped block. When the image decoder module 128 realizes that the particular block was encoded as a skipped block, the image decoder module 128 may notify the post-processing module 124 in the signal ENC_STAT that the particular block has a static content. The notification may be made without actually checking the content of the particular block after the particular block has been reconstructed.

The encoding statistics data presented by the image decoder module 128 generally is not compressed since the image decoder module 122 and the post-processor module 124 typically reside in the same hardware/software module. Therefore, the image decoder module 122 and the post-processor module 124 may communicate the encoder statistics information, the encoding information and the pre-processing information via a high speed interface, or a memory interface using an internal data structure. The encoding statistics information may include, but is not limited to, (1) macroblock type decisions, (2) motion vectors, (3) Coded Block Patterns (CPB), (4) Skip mode utilization, (5) motion compensation block sizes and (6) deblocking filter parameters.

The post-processor module 124 may perform additional processing on the decoded image content in the step 158. The additional processing may utilize the pre-processing information, the encoding information and the encoding statistics, where available. The information about pre-processing and encoding (e.g., information explicitly sent and statistics extracted from the decoding the signal) may be used by the image decoder module 128 and/or the post-processor module 124 to perform various adaptive filtering operations during post-processing. As an example, the following post-processing operations could be performed based on the above information from pre-processing and encoding. (1) Edge Enhancement: based on the edge content information, edge motion information, high frequency content and texture information, the post-processor module 124 may perform an adaptive edge-enhancement filter. As mentioned earlier, edge information lost in scaling and lossy compression may be partially to fully restored based on the pre-processing information and the encoding information received through the medium 106. (2) Sharpening: based on the high frequency information and/or motion content, the post-processor module 124 may perform an adaptive sharpening filtering. (3) Motion-adaptive temporal filtering: based on the motion content from pre-processing, motion vectors from encoding and/or quantization information from encoding, an adaptive temporal filter may be implemented in the player circuit 108. The filtering may be adapted to the motion, for example, by performing a stronger low pass filtering on areas of low motion. The amount of filtering is generally adapted to the image content based on different statistics. For areas that have been heavily quantized by the image encoder module 116, a combination of adaptive temporal filtering and texture-based filtering may improve typical instabilities of H.264-based content, such as temporally unstable blurred/sharp macroblocks. (4) Skin tone correction: with knowledge of areas of the original pictures where skin is present, the post-processor module 124 may adjust color post-processing to render human features better. (5) Improved color processing: for low bit rates, the fidelity of fully saturated colors, especially in the red area of the spectrum, may be severely compromised. When the post-processor module 124 has information regarding original color areas, the post-processor module 124 may tailor color post-processing/enhancements to improve picture quality. (6) Comfort noise quality improvements: some areas of the picture may benefit from an addition of carefully specified noise. The H.264 standard generally includes provisions for Film Grain characteristics transmission in SEI messages. By sending block statistical information, the player 108 may intelligently manage film grain or add internally created comfort noise to improve picture quality to particular areas that would benefit from noise addition. For example, areas that have high texture may be improved with added comfort noise. When the high texture areas are encoded with a high quantization step size, the high texture areas generally suffer from "softness" of blurriness artifacts. Adding a controlled amount of random noise to such areas may improve the perceived subjective quality. (7) Deblocking management: the H.264 standard has a provision for signaling display of non-deblocked pictures in SEI messages. Sending the SEI control information along with statistical picture data may improve the performance at the player circuit 108. The above approach generally has an added benefit of reducing power consumption at the player circuit 108 by intelligently signaling information for high quality decoding at reduced computational loads. (8) Up-Sampling: up-sampling ratios and up-sampling filter implementations may be determined from the corresponding down-sampling ratios and filter information received from the source circuit 104. (9) Color Conversion: generally involves restoring chrominance data reduced during pre-processing and/or encoding.

In the step 160, the display 110 may generate a visual display of the image content in the signal IMAGE_OUT. The reconstructed pictures, along with the side information from the pre-processor module 112 and the image encoder module 116 may be passed to the post-processor module 124 to generate the final reconstructed pictures for display.

Figure 3:
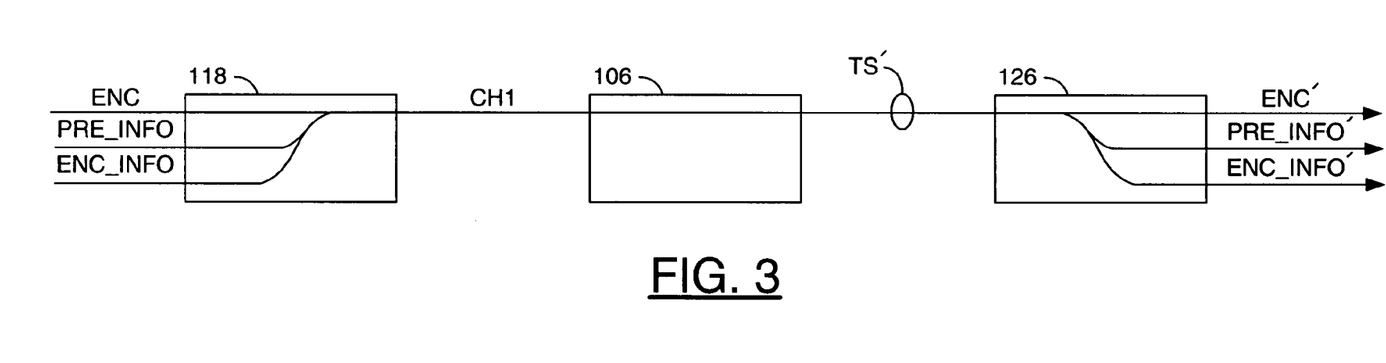
FIG. 3 is a block diagram of a first example implementation for transferring data.

Referring to FIG. 3, a block diagram of a first example implementation for transferring data is shown. All of the pre-processing/encoder side information may be communicated from the source circuit 104 to the player circuit 108 in a number of different ways. For example, the information may be embedded in the signal TS by the data insertion module 118 using user-defined messages/syntax elements. The embedding operation may use an efficient and lossless process, such as entropy encoding and other state-of-the-art lossless coding techniques. The pre-processing information and the encoding information may also be transmitted using higher level syntax, for example an MPEG-2 system syntax. At the player 108 side, the data extraction module 126 may separate the pre-processing information and the encoding information from the image content.

Figure 4:
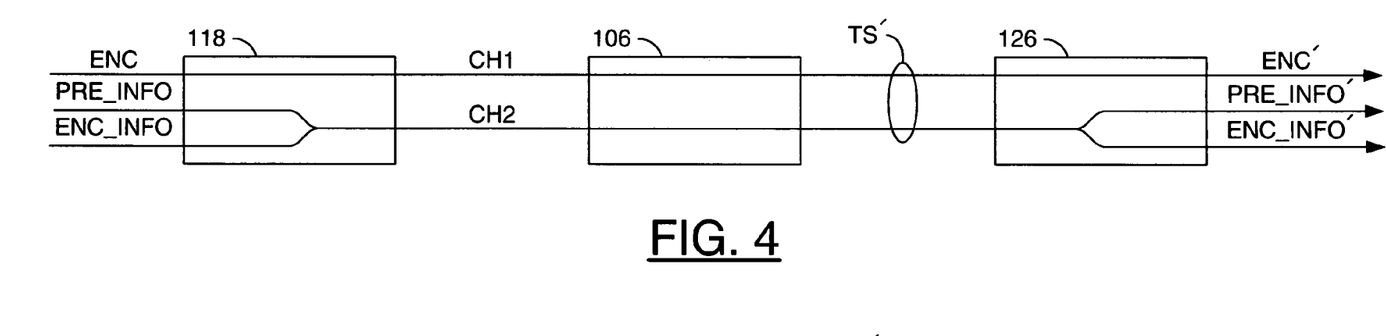
FIG. 4 is a block diagram of a second example implementation for transferring data.

Referring to FIG. 4, a block diagram of a second example implementation for transferring data is shown. The pre-processing information and the encoding information may be transmitted as side information is a separate signal from the image content. The methods of transferring the separate signal information could also be implemented in different ways. In a communication system, the separate signal may be simultaneously transferred through a transmission medium 106 using a side-channel (e.g., CH2) that is different from a main channel (e.g., CH1) used for the image content signal. In a storage system, the different channels may be implemented as different locations in a storage medium 106.

Figure 5:
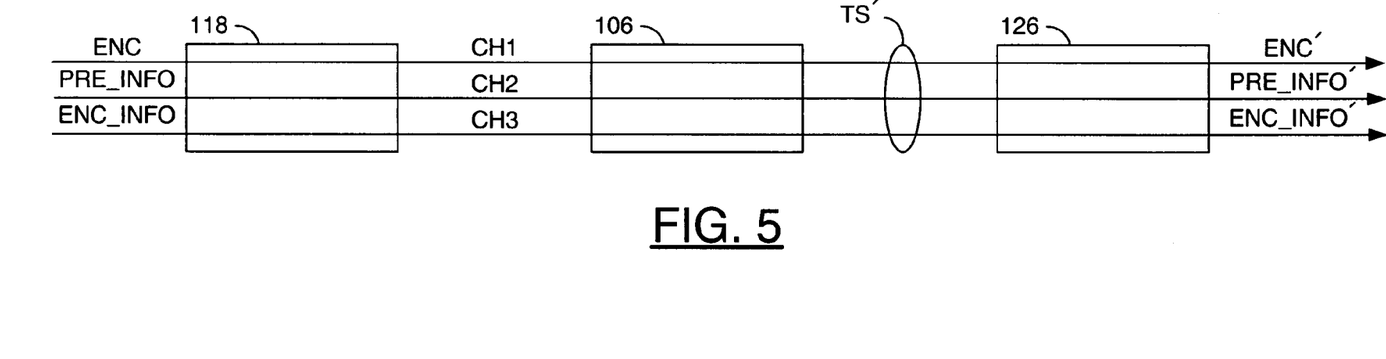
FIG. 5 is a block diagram of a third example implementation for transferring data.

Referring to FIG. 5, a block diagram of a third example implementation for transferring data is shown. The image content may be transferred in the main channel/storage location CH1, as in a conventional application. The pre-processing information may be transferred in the second channel/storage location CH2 as before. However, the encoding information may be simultaneously transferred in a third channel/storage location (e.g., CH3), separate from the other two channels/storage locations CH1 and CH2.

The function performed by the block diagram and the flow diagram of FIGS. 1-2 may be implemented and/or modeled using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for image decoding, comprising the steps of:
   (A) receiving from a medium (i) an encoded signal, (ii) encoding statistics embedded in said encoded signal and (iii) a pre-processing signal carrying pre-processing information, wherein (a) said encoding statistics are created by an encoder in encoding an intermediate input signal to create said encoded signal and (b) said pre-processing information is created by a pre-processor in converting an image input signal into said intermediate input signal;
   (B) generating an intermediate output signal by decoding said encoded signal in a decoder circuit, wherein said decoding is performed in response to said pre-processing information;
   (C) generating a statistics signal in said decoding of said encoded signal, wherein said statistics signal (i) carries said encoding statistics created by said encoder and (ii) is separate from said intermediate output signal; and
   (D) generating an image output signal from a post-processor circuit by processing said intermediate output signal in response to both said statistics signal and said pre-processing signal, wherein said image output signal carries at least one image.

2. The method according to claim 1, wherein step (A) comprises the sub-step of:
   receiving an information signal carrying encoding information from said medium, wherein said encoding information is created by said encoder in said encoding of said intermediate input signal.

3. The method according to claim 2, wherein said encoding information is embedded in said encoded signal while in said medium.

4. The method according to claim 2, wherein said encoding information comprises at least one of (i) edge information about one or more edges in a block of said image, (ii) high frequency information about a high frequency content of said block, (iii) motion information about a level of motion within said block, (iv) intensity information about an intensity average within said block, (v) variance information about a pixel variance within said block, (vi) color area information about areas of said image with one or more specific colors, (vii) noise information about comfort noise of said block and (viii) film grain information about film grain characteristics of said block.

5. The method according to claim 1, wherein step (A) comprises the sub-step of:
   extracting said pre-processing signal and said encoded signal from a transport signal received through said medium.

6. The method according to claim 1, wherein step (A) comprises the sub-steps of:
   receiving said encoded signal from a first channel of said medium; and
   receiving said pre-processing signal from a second channel of said medium.

7. The method according to claim 1, wherein said processing of said intermediate output signal comprises at least one of (i) edge enhancement, (ii) sharpening, (iii) motion-adaptive filtering, (iv) skin tone correction, (v) color processing, (vi) comfort noise quality improvement, (vii) deblocking management, (viii) up-sampling and (ix) color conversion.

8. The method according to claim 1, wherein said encoding statistics comprise at least one of (i) a macroblock type decision, (ii) a motion vector, (iii) a coded block pattern, (iv) a skip mode utilization, (v) a motion compensation block size and (vi) a deblocking filter parameter.

9. An apparatus comprising:
   a decoder configured to (A) receive from a medium (i) an encoded signal, (ii) encoding statistics embedded in said encoded signal and (iii) a pre-processing signal carrying pre-processing information, wherein (a) said encoding statistics are created by an encoder in encoding an intermediate input signal to create said encoded signal and (b) said pre-processing information is created by a pre-processor in converting an image input signal into said intermediate input signal, (B) generate an intermediate output signal by decoding said encoded signal, wherein said decoding is performed in response to said pre-processing information and (C) generate a statistics signal in said decoding of said encoded signals, wherein said statistics signal (i) carries said encoding statistics created by said encoder and (ii) is separate from said intermediate output signal; and
   a post-processor configured to generate an image output signal by processing said intermediate output signal in response to both staid statistics signal and said pre-processing signal, wherein said image output signal carries at least one image.

10. The apparatus according to claim 9, wherein said decoder comprises:
    an extraction module configured to separate said encoded signal and said pre-processing signal from a transport signal received through said medium; and
    a decoder module configured to (i) generate said intermediate output signal by decoding said encoded signal and (ii) reconstruct said encoding statistics from said encoded signal.

11. A method for image encoding, comprising the steps of:
(A) generating an intermediate input signal by converting an image input signal received into a pre-processor circuit, wherein said image input signal carries at least one image;
(B) generating a pre-processing signal carrying pre-processing information created in said converting of said image input signal;
(C) generating (i) an encoded signal by encoding said intermediate input signal received by an encoder circuit and (ii) encoding statistics embedded in said encoded signal, wherein (a) said encoding statistics are created in said encoding of said intermediate input signal and (b) said encoding of said intermediate input signal is based on said pre-processing signal; and
(D) transferring into a medium (i) said encoded signal and (ii) said pre-processing signal.

12. The method according to claim 11, wherein step (C) comprises the sub-step of:
generating an information signal carrying encoding information, wherein (i) said encoding information is created in encoding said intermediate input signal and (ii) said information signal is separate from said encoded signal.

13. The method according to claim 12, wherein said encoding information comprises at least one of (i) pixel level information and (ii) macroblock level information.

14. The method according to claim 11, further comprising the step of:
embedding said pre-processing signal into said encoded signal.

15. The method according to claim 11, wherein step (D) comprises the sub-steps of:
transferring said encoded signal into a first channel of said medium; and
transferring said pre-processing signal into a second channel of said medium.

16. The method according to claim 11, wherein said pre-processing information comprises at least one of (i) edge content information, (ii) high frequency information, (iii) motion information, (iv) areas of skin information, (v) color processing information, (vi) conform noise information, (vii) deblocking information, (viii) down-sampling information, and (ix) color conversion information.

17. The method according to claim 11, wherein said encoded signal is compliant with at least one of an International Organization for Standardization/International Electrotechnical Commission 14496-10 standard and an International Telecommunication Union-Telecommunications Standardization Sector Recommendation H.264.

18. An apparatus comprising:
a pre-processor configured to generate (i) an intermediate input signal by converting an image input signal and (ii) a pre-processing signal carrying pre-processing information created in said converting of said image input signal, wherein said image input signal carries at least one image; and
an encoder configured to (A) generate an encoded signal by encoding said intermediate input signal, (B) generate encoding statistics embedded in said encoded signal, wherein (a) said encoding statistics are created in said encoding of said intermediate input signal and (b) said encoding of said intermediate input signal is based on said pre-processing signal and (C) transfer into a medium (i) said encoded signal and (ii) said pre-processing signal.

19. The apparatus according to claim 18, wherein said encoder comprises:
an encoder module configured to (i) generate said encoded signal and (ii) generate an information signal carrying encoding information, wherein (a) said encoding information is created in said encoding of said intermediate input signal and (b) said information signal is separate from said encoded signal; and
an insertion module configured to transfer into said medium (i) said encoded signal, (ii) said pre-processing signal and (iii) said information signal.

20. The apparatus according to claim 19, wherein said insertion module transfers (i) said encoded signal into a first channel of said medium, (ii) said pre-processing signal into a second channel of said medium and (iii) said information signal into a third channel of said medium.

* * * * *